Patented Mar. 2, 1948

2,436,974

UNITED STATES PATENT OFFICE 2,436,974

PROCESS FOR PREPARING POTASSIUM STANNATE

Hartmut W. Richter, Rahway, N. J., assignor to Metal & Thermit Corporation, New York, N. Y., a corporation of New Jersey No Drawing. Application May 2, 1944, Serial No. 533,805

3 Claims. (Cl. 23—53)

This invention relates to an improved method of making potassium stannate substantially free from insoluble inorganic matter and organic impurities.

Potassium stannate is used in electrolytic plating baths from which tin may be deposited rapidly and conveniently. The solution is made up by dissolving the potassium stannate in aqueous potassium hydroxide. The stannate crystals of commerce frequently contain both inorganic and organic impurities, both or either of which interfere with the proper functioning of the bath. Heretofore those impurities have been hard to remove.

When a tin compound resulting from the detinning of tin plate clippings has been used in the manufacture of the potassium stannate, for example, the alkaline solutions derived from the detinning operations are usually contaminated with organic matter and with such inorganic impurities as silicates and aluminates. Such solutions are stripped of their tin content by neutralization with acid, and some of these impurities are thrown down together with the tin and are not eliminated by washing. When the precipitated and washed tin compound, referred to in the preceding sentence, is digested with caustic potash solution in order to produce potassium stannate, the organic impurities dissolve in the alkaline solution and only the insoluble inorganic impurities can be removed by filtering or settling. This is difficult when filtration is attempted, and expensive when settling is resorted to since, in the latter case, the solution must first be diluted. The dilution, unless done with softened water, introduces additional inorganic impurities, among which calcium is predominant and causes loss of tin. All the water added has to be evaporated again at considerable expense of money and time, and no reduction in the amount of organic impurities has been accomplished. On subsequent evaporation of the alkaline solution to a point where potassium stannate crystallizes on cooling, the organic impurities are also precipitated, the potassium stannate crystals are usually discolored, and are of lowered tin content.

I have now discovered a method which permits removal of inorganic as well as organic impurities and which, in one inexpensive step, does away with the need of dilution. In order to accomplish this, I take the tin compound resulting from the neutralization of impure sodium stannate solution, preferably in the form of a wet filter cake, and to this cake I add potassium hydroxide either as a solid or as a solution until the tin compound is just dissolved, but the impurities are left undissolved and visibly suspended in the liquid. When this point is reached the tin compound seemingly forms a concentrated colloidal solution. The liquor thus prepared has a much higher tin content and therefore a higher specific gravity than could be obtained if enough potassium hydroxide has been used to combine with the tin to form a true solution. I have found that such sols are ideally suited for the removal of both organic and inorganic impurities because the former will float on top of the liquor where they may be skimmed off, and the latter settle to the bottom and are left behind by decantation.

After I have eliminated the organic and inorganic impurities, I add more than enough additional potassium hydroxide to combine with the tin present as potassium stannate, and evaporate the liquor until a crop of potassium stannate crystals is obtained on cooling to room temperature. An excess of KOH should be employed in order to convert the colloidal tin oxide sol to a crystalline potassium stannate solution completely. The product obtained by my process is largely free from organic and inorganic impurities.

The following specific example illustrates my method of making substantially pure potassium stannate, without constituting a limitation to percentages, weights, or conditions.

By neutralizing a sodium stannate solution from a detinning operation, there was obtained a hydrous impure tin oxide filter cake weighing 1290 grams and containing approximately 34% tin. This cake was peptized with potassium hydroxide in the form of a cold saturated solution until the tin compound, but not the impurities, had been dissolved. 80 grams of KOH solution were used. There resulted 770 cc. of a sol containing 570 g./l. tin and 100 g./l. potassium hydroxide. After standing overnight in a separatory funnel, and after removal of a small amount of solid matter, 740 cc. of clear sol were withdrawn and 30 cc. of a very dark sludge were left behind. The sol and the sludge plus the solid matter were converted separately to yield a true potassium stannate solution by adding potassium hydroxide to each in more than sufficient quantity to form potassium stannate, and evaporating until a boiling point of 120° C. was obtained. Both solutions were then diluted to the point where the boiling point was 110° C. and allowed to cool to room temperature, whereupon crystals formed. The crystals which had formed in the two solutions were filtered off and redissolved in distilled water. The water solution of the crystals made from the clear sol was practically clear, having a light tan color, whereas the solution of the crystals made from the sludge was dark brown and very muddy, indicating the presence of both the organic and inorganic impurities that had been removed from the tin compound cake.

As many apparently widely different embodiments of this invention may be made without departing from the spirit and scope thereof, it is to be understood that I do not limit myself to the specific embodiments thereof except as defined in the appended claims.

What I claim is:

1. The process of preparing potassium stannate which comprises adding to an impure tin compound an amount of caustic potash in the presence of a sufficient amount of water to form at least a colloidal solution of the tin values, the amounts of caustic potash and water being sufficient at least to produce such solution but insufficient to completely combine with the tin values present to form potassium stannate, the impurities present in the tin compound being left undissolved in the colloidal solution and physically separable therefrom, separating said impurities from the solution, adding a sufficient further amount of caustic potash such as to completely combine with the tin values to form potassium stannate.

2. The process of preparing potassium stannate which comprises adding to an impure tin compound an amount of caustic potash in the presence of a sufficient amount of water to form at least a colloidal solution of the tin values, the amounts of caustic potash and water being sufficient at least to produce such solution but insufficient to completely combine with the tin values present to form potassium stannate, the impurities present in the tin compound being left undissolved in the colloidal solution and physically separable therefrom, separating said impurities from the solution, adding a sufficient further amount of caustic potash such as to completely combine with the tin values to form potassium stannate, and recovering the potassium stannate from the solution.

3. The process of preparing potassium stannate which comprises adding to an impure hydrous tin oxide an amount of caustic potash in the presence of a sufficient amount of water to form at least a colloidal solution of the tin values, the amounts of caustic potash and water being sufficient at least to produce such solution but insufficient to completely combine with the tin values present to form potassium stannate, the impurities present in the tin compound being left undissolved in the colloidal solution and physically separable therefrom, separating said impurities from the solution, adding a sufficient further amount of caustic potash such as to completely combine with the tin values to form potassium stannate.

HARTMUT W. RICHTER.

REFERENCES CITED

The following references are of record in the file of this patent:

FOREIGN PATENTS

| Number | Country | Date |
|---|---|---|
| 273,440 | Great Britain | July 7, 1927 |